(12) United States Patent
Gutalj

(10) Patent No.: US 6,559,403 B2
(45) Date of Patent: May 6, 2003

(54) THREE-POSITION ELECTRICAL SWITCH HAVING A SWITCHING ELEMENT THAT IS MOVABLE IN AXIAL TRANSLATION

(75) Inventor: Vladimir Gutalj, Oberentfelden (CH)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/789,674

(22) Filed: Feb. 22, 2001

(65) Prior Publication Data

US 2001/0025828 A1 Oct. 4, 2001

(30) Foreign Application Priority Data

Feb. 23, 2000 (FR) .............................. 00 02249

(51) Int. Cl.⁷ .............................................. H01H 33/70
(52) U.S. Cl. .............................. 218/79; 218/43; 218/55; 218/65
(58) Field of Search ................... 218/43–88, 118, 218/120, 140, 154, 100; 361/604–621

(56) References Cited

U.S. PATENT DOCUMENTS 4,413,166 A * 11/1983 Meyer .......................... 218/45
5,625,179 A   4/1997 Bleiker et al. ................. 218/80
5,721,412 A   2/1998 Schifko et al. ................ 218/43

FOREIGN PATENT DOCUMENTS

FR   2 346 884   10/1977

OTHER PUBLICATIONS

French Search Report date Oct. 30, 2000.

* cited by examiner

Primary Examiner—Lincoln Donovan
(74) Attorney, Agent, or Firm—Sughrue Mion, PLLC

(57) ABSTRACT

The three-position, gas-insulated, metal-clad electrical switch inside a metal casing includes first and second break contacts, a fixed grounding contact, and a switching element that is movable in an axial direction to interconnect the break contacts. The first and second break contacts and the fixed grounding contact are superposed in the axial direction, and the switching element is moved by a drive rod which passes through the fixed grounding contact, thereby enabling the switching element to occupy each of the three switching positions including a grounding position in which it connects the first break contact to the fixed grounding contact.

6 Claims, 1 Drawing Sheet

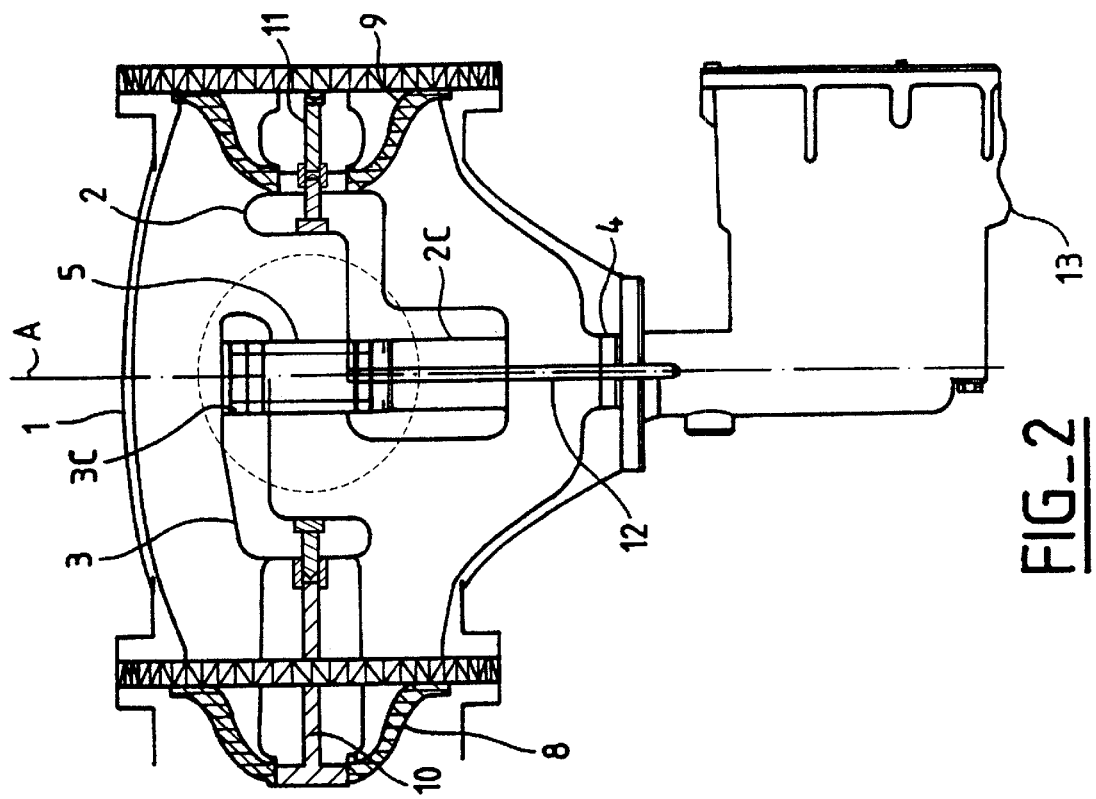
FIG_1
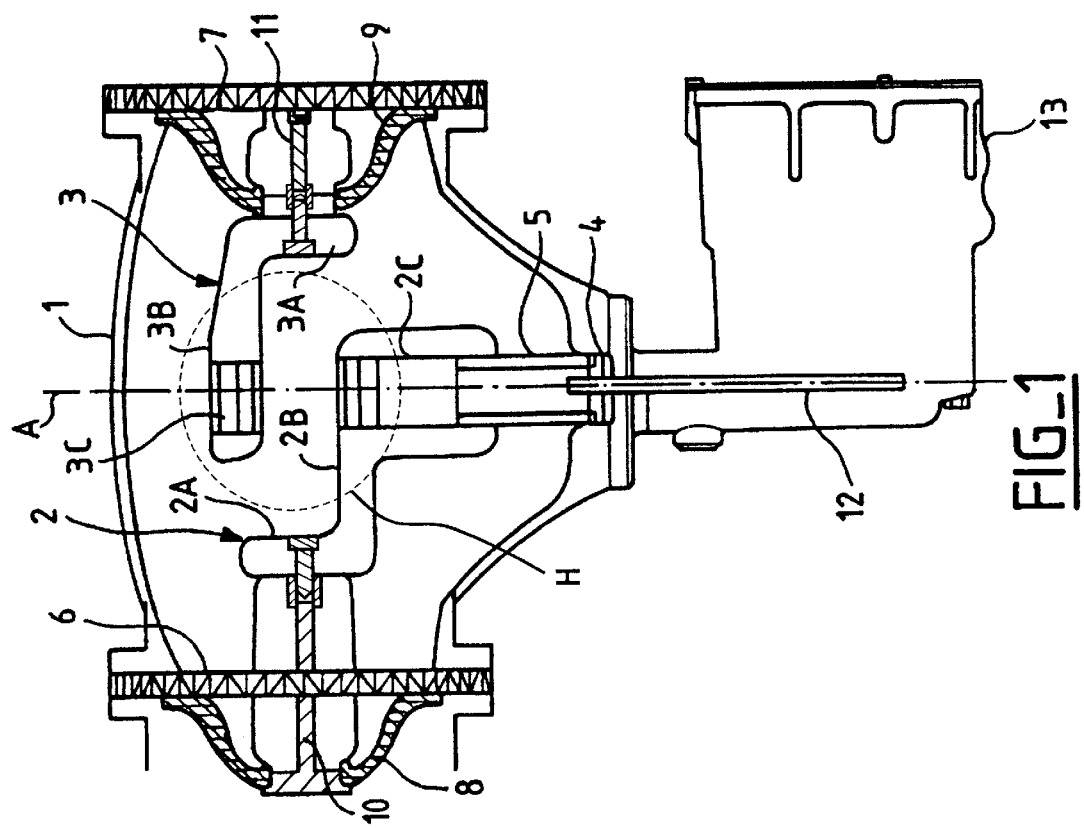
FIG_2

THREE-POSITION ELECTRICAL SWITCH HAVING A SWITCHING ELEMENT THAT IS MOVABLE IN AXIAL TRANSLATION

The invention relates to a three-position, gas-insulated metal-clad electrical switch, the switch comprising two fixed break contacts each connected to a phase conductor, and a fixed ground contact together with a switching element that is movable in an axial direction to interconnect the fixed contacts.

BACKGROUND OF THE INVENTION

Such an electrical switch is more particularly used for disconnection purposes when interconnecting phase conductors in a high-voltage installation. The switch is then generally referred to as a disconnector, and the three switching positions that can be achieved are conventionally:

opening the disconnector without grounding a phase conductor;

opening at the disconnector while grounding one of the two break contacts; and closing the disconnector with the break contacts interconnected.

In the state of the art, one of the break contacts is generally grounded by a switching element that is different from the switching element that is used for interconnecting the break contacts. The resulting devices are thus relatively bulky. Furthermore, such devices cannot provide great flexibility in use, since once the switch has been installed, it is no longer possible to interchange that one of the two break contacts which can be grounded with the other break contact. A change to the grounding configuration then requires the switch to be reinstalled.

OBJECT AND SUMMARY OF THE INVENTION

The object of the invention is to provide a three-position electrical switch of structure that is both simple and compact, and that can be used with different interconnection schemes without changing the external structure of the switch.

To this end, the invention provides a three-position, gas-insulated, metal-clad electrical switch inside a metal casing, the switch comprising first and second break contacts, a fixed grounding contact, and a switching element that is movable in an axial direction to interconnect said break contacts, wherein the first and second break contacts and said fixed grounding contact are superposed in said axial direction, and wherein said switching element is moved by means of a drive rod which passes through the fixed grounding contact, thereby enabling said switching element to occupy each of the three switching positions including a grounding position in which it connects the first break contact to the fixed grounding contact. With this disposition, the fixed break contacts and the ground contact are disposed substantially in alignment and can be received together with the switching element in a casing of metal cladding that is very compact in shape, the drive rod penetrating in sealed manner into the inside of the casing in order to move the switching element along said alignment of contacts.

In a particular embodiment of the switch of the invention, each break contact has a bore in which the switching element can penetrate.

In a particular embodiment of the switch of invention, the first break contact which is connectable to the fixed grounding contact by the switching element has a bore of length in the axial direction that is not less than the length of the switching element.

In a particular embodiment of the switch of the invention, the casing possesses two opposite openings on either side of the axial direction, each opening being provided with an electrically insulating support serving to hold an electrode on which one of said break contacts is fixed in a removable manner.

In a particular embodiment of the switch of the invention, each of the break contacts has a first arm which extends parallel to said axial direction and which is fixed to an electrode, and also a second arm which extends perpendicularly to the first arm to form an L-shape therewith, and into which the switching element penetrates, said break contacts being disposed in such a manner that the two L-shapes form a rectangle.

In a particular embodiment of the switch of invention, the first and second break contacts can be interchanged inside the casing by an operator in order to interchange that one of the two electrodes which can be grounded. This construction makes it possible to connect one or other of the electrodes to ground as a function of the selected interconnection scheme. As an option, a leak-proof inspection hatch of sufficient size can be provided in the casing of the switch to enable an operator to access the fixing means for fixing the break contacts to the electrodes.

BRIEF DESCRIPTION OF THE DRAWING

An embodiment of the switch of the invention is described below in detail with reference to the drawing.

FIG. 1 is a diagrammatic section view of the switch of the invention in which one of the two break contacts is grounded.

FIG. 2 is a diagrammatic section view of the switch of the invention in which the two break contacts are interconnected by means of the switching element.

MORE DETAILED DESCRIPTION

In FIGS. 1 and 2, the three-position electrical switch or disconnector of the invention comprises a metal casing 1 containing a dielectric gas, e.g. $SF_6$, under a pressure of a few bars, and within which there are fixed first and second break contacts 2 and 3 together with a grounding contact 4. The casing 1 also contains a cylindrical switching element 5 which is movable along an axial direction A.

The casing 1 presents at least first and second openings 6 and 7 placed facing each other on opposite sides of the direction A, each implemented in this example by a perforated disc of insulating material. Each opening 6 or 7 is provided with an electrically insulating support 8 or 9, e.g. implemented in the form of a cone or a disc. Each support 8 or 9 serves to support a current-conducting electrode 10 or 11 on to which a break contact 2 or 3 is removably fixed, e.g. by, means of bolts. As can be seen in figures, each of the electrodes 10 and 11 extends from the center of an opening in the casing, and the electrodes are in alignment with each other. By way of example, the switch can be connected via its first opening 6 to the metal casing of a metal-clad circuit breaker, and via its second opening 7 to an overhead feeder for connection to an air-insulated line.

Each break contact 2, 3 has a first arm 2A, 3A which extends parallel to the direction A and which is fixed removably to an electrode, and a second arm 2B, 3B which extends perpendicularly to the first arm to form an L-shape therewith. The second arm 2B, 3B of each break contact has a bore 2C, 3C into which the switching element 5 penetrates.

In the structure shown in FIGS. 1 and 2, the break contacts 2 and 3 are disposed in such a manner that the two L-shapes form a rectangle. In this disposition, for two arms 2B, 3B of the break contacts are superposed on the direction A, and the two bores 2C and 3C are in coaxial alignment with the switching element 5.

The switching element 5 is moved in translation along the direction A by means of a rigid drive rod 12 which is made of insulating material and which penetrates into the inside of the casing 1 via a bushing placed in a setback of the casing 1 and extending into another casing 13 connected to the casing 1 and in which the control mechanism for the rod 12 is located.

The ring-shape grounding contact 4 is placed in a setback of the casing 1 which is connected to ground potential, and it surrounds the insulating rod 12 in a coaxial manner. The grounding contact 4 also surrounds one end of the switching element 5 when it is in the grounding position.

The bore 2C of the break contact 2 closest to the grounding contact is of a length in the axial direction A that is not less than the length of the switching element 5. Thus, the bore 2C is long enough in the axial direction A firstly to guide the switching element 5 in translation and secondly to contain an entire switching element when the switch is in the open position without one of its phase conductors being grounded. The break contact 2 has rounded outer edges to counter the Corona-discharge effect so as to limit the risk of an electric arc striking with the casing 1, while the switch is in said open position without grounding. This position of the switching element 5 is not shown, since it lies between the other two positions which are shown in FIGS. 1 and 2.

In FIG. 1, the first break contact 2 is fixed to the electrode 10 situated on the left-hand side of the casing 1, and the second of break contact 3 is fixed to the electrode 11 on the right-hand side of the casing 1. In this figure, one end of the switching element 5 is engaged in the grounding contact 4, while its other end penetrates part of the way into the bore 2C of contact 2. In this position of the switching element, the electrode 10 connected to the first break contact 2 is grounded. The electrode 11 connected to the second break contact 3 cannot be grounded in any of the positions of the switching element.

In FIG. 2, the break contacts 2 and 3 are interchanged relative to the electrodes 10 and 11 compared with the disposition of FIG. 1. More particularly, the first break contact 2 is now fixed to the electrode 11 while the second break contact 3 is fixed to the electrode 10. In order to interchange the contacts in this way it is necessary to uncover the opening 7 of the switch after exhausting the insulating gas from inside the casing 1. The break contact 2 or 3 fixed to the electrode 11 must be disconnected from the insulating support 9, e.g. by undoing bolts, and prior to removing the opening 7 if the contact in question is contact 2, since this contact surrounds part of the switching element 5. As an alternative or in addition to uncovering the opening 7, a hatch can be provided in the casing 1 of the switch and can be made large enough to enable an operator to access the fixing means for fixing the break contacts 2 and 3 to the electrodes 10 and 11. The fixing means can consist merely in screw fasteners. Once the contacts 2 and 3 have been withdrawn from the electrodes 10 and 11, these contacts are interchanged so as to obtain an arrangement that is symmetrical to the initial arrangement, as can be seen in FIG. 2 when compared with FIG. 1, and the contacts are again fixed to the electrodes 10 and 11. The switch is then re-closed in a leak-proof manner and it is refilled with insulating gas. In the example described, the electrode 10 cannot be grounded, with this grounding function now being performed by the electrode 11. The operation of interchanging the contacts can be performed by an operator using simple tools, and it does not require additional connection pieces to be provided.

In the example shown in FIG. 2, the switching element 5 passes through the bore 2C of the first break contact 2 while remaining partially engaged therein, and it penetrates into the bore 3C of the second break contact 3. The two break contacts 2 and 3 are thus electrically interconnected. The switch is then in the closed position interconnecting the phase conductors that are connected to the electrodes 10 and 11. If the break element 5 is then moved so as to occupy the position shown in FIG. 1, then the electrode 11 having the first break contact 2 connected thereto is grounded.

The structure of the two break contacts and of the grounding contact in the invention makes it possible to obtain adequate insulation distances between these contacts, even inside a casing that is compact in shape. In addition, this disposition of the contacts 2, 3, and 4 relative to the switching element 5 subsequently enables the break contacts 2 and 3 to be interchanged, thereby interchanging the particular one of the electrodes 10 and 11 that can be grounded.

This interchanging can be performed by means of an operation that is relatively simple, even after the switch has already been in service, and without requiring the outside structure of the case 1 or of the control mechanism for the drive rod 12 to be changed.

What is claimed is:

1. A three-position, gas-insulated, electrical switch inside a metal casing, the switch comprising first and second break contacts, a fixed grounding contact, and a switching element that is movable in an axial direction to interconnect said break contacts, wherein the first and second break contacts and said fixed grounding contact are superposed in said axial direction, and wherein said switching element is moved by a drive rod which passes through the fixed grounding contact, such that said switching element is operative to occupy each of three switching positions including a grounding position in which said switching element connects the first break contact to the fixed grounding contact.

2. The switch of claim 1, in which each break contact has a bore in which the switching element penetrates.

3. The switch of claim 2, in which the first break contact has a bore of a length in the axial direction which is not less than the length of the switching element.

4. The switch of claim 1, in which the casing possesses two opposite openings on either side of the axial direction, each opening being provided with an electrically insulating support serving to hold an electrode on which one of said break contacts is removably fixed by means for fixing.

5. The switch of claim 4, in which each of the break contacts has a first arm which extends parallel to said axial direction and which is fixed to an electrode, and also a second arm which extends perpendicularly to the first arm to form an L-shape therewith, and into which the switching element penetrates, said break contacts being disposed in such a manner that the two L-shapes form a rectangle.

6. The switch of claim 4, in which the metal casing includes a hatch that is large enough to enable an operator to access said means for fixing the break contacts to the electrodes, after emptying the insulating gas from said casing, whereby the first and second break contacts can be interchanged inside the casing by the operator in order to interchange that one of the two electrodes which can be grounded.

\* \* \* \* \*